(12) United States Patent
Ogatsu

(10) Patent No.: US 8,787,995 B2
(45) Date of Patent: Jul. 22, 2014

(54) PORTABLE DEVICE

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/634,966

(22) PCT Filed: Apr. 7, 2011

(86) PCT No.: PCT/JP2011/002074
§ 371 (c)(1),
(2), (4) Date: Sep. 14, 2012

(87) PCT Pub. No.: WO2011/145261
PCT Pub. Date: Nov. 24, 2011

(65) Prior Publication Data
US 2013/0005410 A1    Jan. 3, 2013

(30) Foreign Application Priority Data

May 20, 2010 (JP) ................................. 2010-116123

(51) Int. Cl.
*H04M 1/00* (2006.01)
(52) U.S. Cl.
USPC ...................................................... 455/575.4
(58) Field of Classification Search
USPC .............................. 455/575.4, 575.1; 361/727
See application file for complete search history.

(56) References Cited

U.S. PATENT DOCUMENTS

2004/0157653 A1* 8/2004 Kato ........................... 455/575.4
2005/0215298 A1   9/2005 Lee
2007/0155451 A1* 7/2007 Lee ............................. 455/575.4
2010/0120479 A1   5/2010 Ogatsu
2013/0010430 A1* 1/2013 Ogatsu .......................... 361/727
2013/0010431 A1* 1/2013 Ogatsu et al. .................. 361/727

FOREIGN PATENT DOCUMENTS

| JP | 2003-234809 A | 8/2003 |
| JP | 2004-235897 A | 8/2004 |
| JP | 2005-269566 A | 9/2005 |
| JP | 2005-286994 A | 10/2005 |
| JP | 2006-005564 A | 1/2006 |
| JP | 2008-113067 A | 5/2008 |
| WO | WO 2008/120701 A1 | 10/2008 |

OTHER PUBLICATIONS

International Search Report in PCT/JP2011/002074 dated Jul. 5, 2011 (English Translation Thereof).

* cited by examiner

*Primary Examiner* — Christian Hannon
(74) *Attorney, Agent, or Firm* — McGinn IP Law Group, PLLC

(57) ABSTRACT

A portable device according to the present invention includes a first unit including a guide member extending in a sliding direction, and a second unit including a sliding member that slides in a groove of the guide member. The first unit includes a protruding section in a second unit side, the protruding section extending in the sliding direction, and the second unit includes a hollow section in a place corresponding to the protruding section of the first unit. Further, at least part of the guide member is formed in the protruding section and formed in such a manner that the part of the guide member gets into the hollow section formed in the second unit. As a result, the thickness of the portable device can be reduced even when the portable device includes a sliding mechanism.

17 Claims, 19 Drawing Sheets

PORTABLE DEVICE

TECHNICAL FIELD

The present invention relates to a portable device such as a mobile phone, a digital camera, and an electronic personal organizer, in particular a sliding mechanism for these portable devices.

BACKGROUND ART

In recent years, the intended purpose of portable devices is not limited to simple telephone calls, but includes wide range of other purposes including transmission/reception of electronic mails, connection to the Internet, and video game functions. Therefore, the development of portable devices having various mechanisms for satisfying both the portability and the operability such as large screen display and a character input function has been in progress.

For example, there is a folding-type portable device, which is usually carried in a folded state. Then, when it is used for a telephone call or mail transmission/reception, it is extended so that the display unit and the operation unit are exposed and various operations can be thereby performed. The folding-type portable device can prevent incorrect operations from being performed when it is carried. However, when it is in the folded state, the display unit is not exposed. Therefore, it is impossible to perform almost all the functions. Therefore, it is necessary to separately provide another display unit that can be viewed in the folded state.

In contrast to this, as for a slide-type portable device, the display unit is always exposed irrespective of whether the portable device is in a retracted state or in an extended state. Therefore, the display unit can be viewed in any state. By providing a minimum key operation unit at the bottom of the display unit, certain operations such as reading an electronic mail and performing an operation on the Internet can be performed, even when it is in the retracted state, i.e., when it is being carried, without changing the portable device from the retracted state. Therefore, the usability is improved. Further, when a user performs an operation such as creating a mail document, the display unit and the key operation unit are slid in parallel so that another key operation unit disposed below the liquid crystal unit is exposed and the user can operate that key operation unit (see Patent literature 1).

In contrast to this, since the full length of the folding-type portable device in the extended state becomes almost twice as long as the length in the folded state, it is possible to secure a large key operation surface. Further, it is possible to dispose the display unit at a certain angle with respect to the operation unit. Therefore, the folding-type portable device has excellent usability both when an operation is performed and when a telephone call is carried out. Further, as a technique in which this feature of the folding-type portable device is incorporated into the slide-type portable device, there are a technique that enables the display unit to be completely detached from the key operation unit (see Patent literature 2) and a technique that enables the display unit to be disposed at a certain angle with respect to the key operation unit (see Patent literatures 3 and 4). Further, Patent literature 5 discloses a technique that enables a portable device to have a large inclination angle after a sliding action is performed.

CITATION LIST

Patent Literature

Patent literature 1: Japanese Unexamined Patent Application Publication No. 2005-286994

Patent literature 2: Japanese Unexamined Patent Application Publication No. 2003-234809

Patent literature 3: Japanese Unexamined Patent Application Publication No. 2005-269566

Patent literature 4: Japanese Unexamined Patent Application Publication No. 2006-005564

Patent literature 5: Japanese Unexamined Patent Application Publication No. 2008-113067

SUMMARY OF INVENTION

Technical Problem

In a portable device equipped with a sliding mechanism, it is necessary to provide, for example, a guide member in the upper unit in such a manner that the guide member extends in the sliding direction and provide a sliding member that slides through this guide member in the lower unit. Note that it is necessary to provide a groove(s) as a mechanism for enabling the sliding member to slide in the guide member. As a result, the thickness of the guide member itself increases, and thus increasing the overall thickness of the portable device.

In view of the above-described problems, an object of the present invention is to provide a portable device capable of reducing the thickness of the portable device even when the portable device includes a sliding mechanism.

Solution to Problem

A portable device according to the present invention includes: a first unit including a guide member extending in a sliding direction; and a second unit including a sliding member that slides in a groove of the guide member, in which the first unit includes a protruding section on a second unit side, the protruding section extending in the sliding direction, the second unit includes a hollow section in a place corresponding to the protruding section of the first unit, and at least part of the guide member is formed in the protruding section and formed in such a manner that the part of the guide member gets into the hollow section formed in the second unit.

Advantageous Effects of Invention

According to the present invention, it is possible to provide a portable device capable of reducing the thickness of the portable device even when the portable device includes a sliding mechanism.

DESCRIPTION OF EMBODIMENTS

Figure 1:
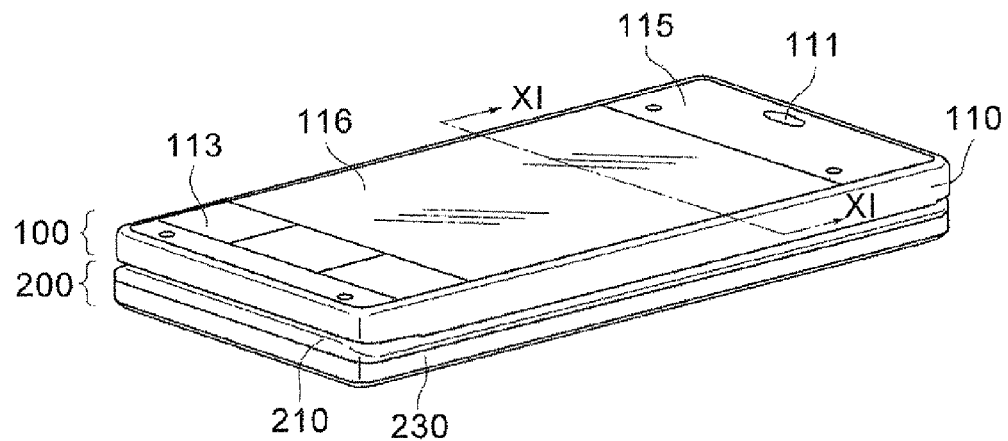
FIG. 1 is a perspective view showing a portable device in a retracted state according to an exemplary embodiment.
Figure 2:
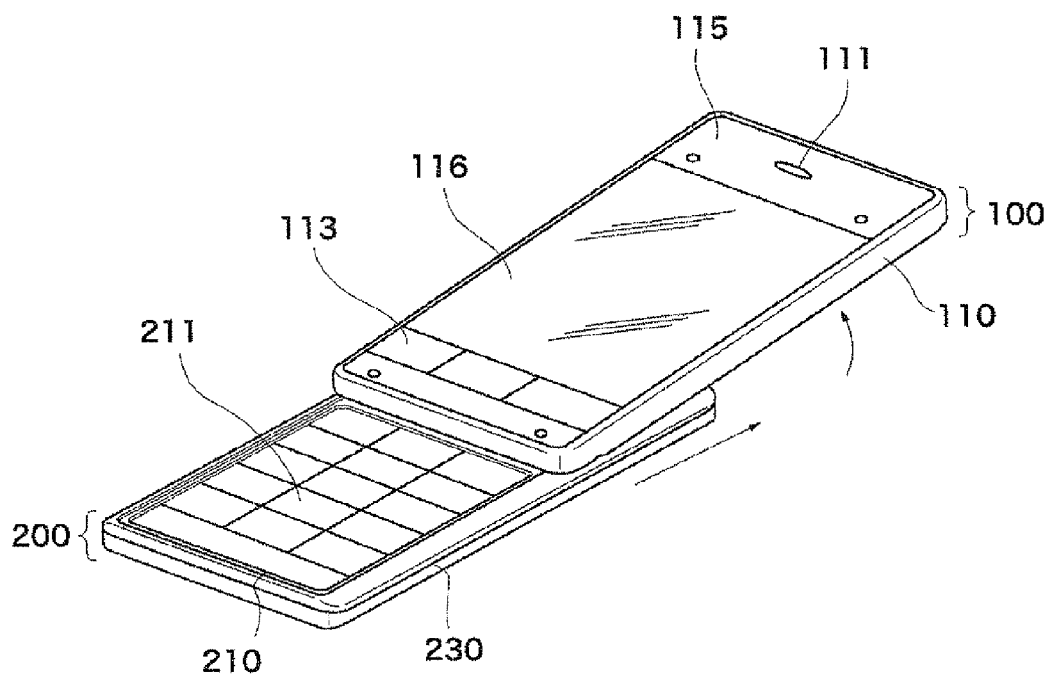
FIG. 2 is a perspective view showing a portable device in an extended state according to an exemplary embodiment.

Exemplary embodiments according to the present invention are explained hereinafter with reference to the drawings. FIG. 1 is a perspective view showing a portable device in a retracted state according to this exemplary embodiment. FIG. 2 is a perspective view showing a portable device in an extended state according to this exemplary embodiment. As shown in FIGS. 1 and 2, a portable device according to this exemplary embodiment includes an upper unit (first unit) 100 and a lower unit (second unit) 200. The upper unit 100 includes an upper case 110 and an upper cover 115 that covers this upper case 110. A receiver sound hole 111, a display-unit cover 116, and a key operation unit 113 are provided in the upper cover 115. Further, a circuit board (not shown) on which electronic components for transmission/reception and for display are mounted is provided inside the upper unit 100.

The lower unit 200 includes a lower case 210 and a lower cover 230 that covers this lower case 210. As shown in FIG. 2, a key operation unit 211 is provided in the lower case 210. Further, a battery(s), semiconductor components necessary for communication and software operations, a circuit board on which those components are mounted, an antenna, a connector(s) for external connection, a vibration motor, and the like (all of which are not shown) are provided inside the lower unit 200.

As shown in FIG. 1, the upper unit 100 and the lower unit 200 are positioned on top of each other as viewed from the top (as viewed from a position opposed to the upper cover 115) in a retracted state. Further, as shown in FIG. 2, the upper unit 100 and the lower unit 200 are slid from each other to the positions where they are displaced from each other in an extended state as viewed from the top. Further, the upper unit 100 is inclined at a predetermined angle with respect to the lower unit 200 in the extended state.

Figure 3:
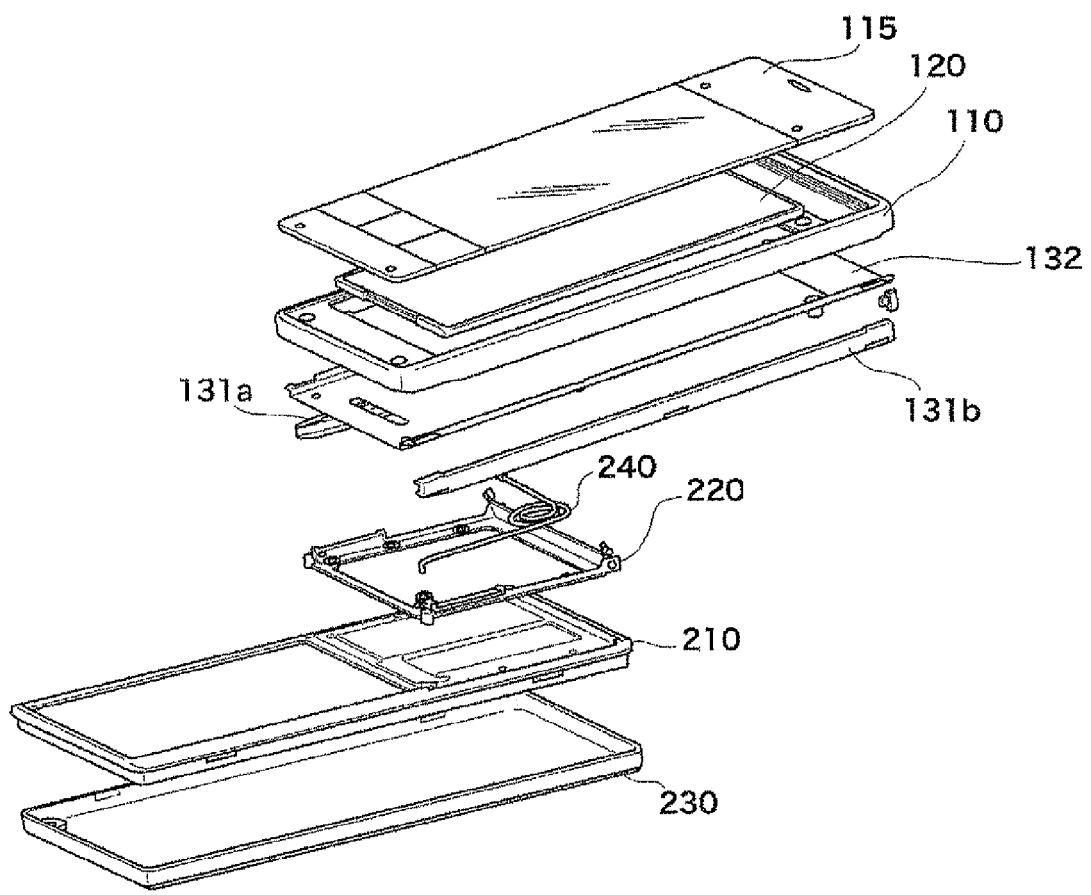
FIG. 3 is a perspective view showing a portable device according to an exemplary embodiment in a disassembled state.
Figure 4:
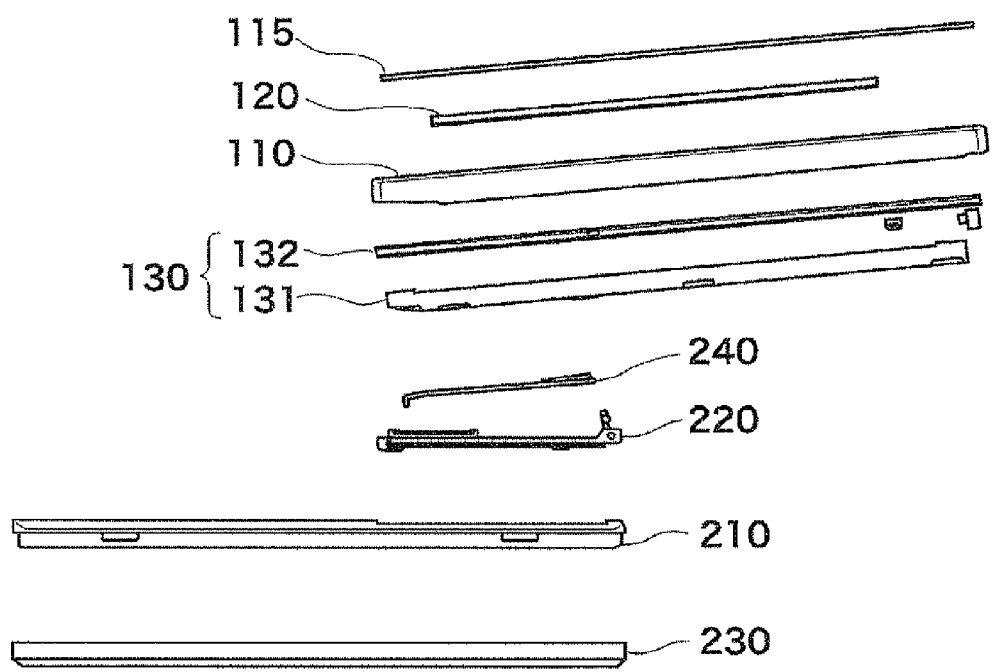
FIG. 4 is a side view showing a portable device according to an exemplary embodiment in a disassembled state.

FIG. 3 is a perspective view showing the portable device according to this exemplary embodiment in a disassembled state, and FIG. 4 shows its side view. As shown in FIGS. 3 and 4, the upper unit 100 includes an upper cover 115, an upper case 110, a display unit 120, guide members 131a and 131b, and a connecting plate 132. The display unit 120 is, for example, a liquid crystal display or an organic EL display. The guide members 131a and 131b are attached to both sides of the connecting plate 132 in such a manner that they extend in the sliding direction, and these components form a guide member unit 130.

Further, the lower unit 200 includes a lower cover 230, a lower case 210, a sliding member 220, and a torsion spring 240. Further, the sliding member 220 of the lower unit 200 is attached in such a manner that the sliding member 220 slides in the guide members 131a and 131b of the guide member unit 130 of the upper unit 100. In this way, the upper unit 100 and the lower unit 200 are slidably attached to each other. The torsion spring 240 is disposed in such a manner that one end of the torsion spring 240 is fixed to the upper unit 100 and the other end is fixed to the lower unit 200, and assists user's manual operation when the user extends or retracts the upper unit 100 and the lower unit 200. Further, a connection cable(s) (not shown) is provided between the upper unit 100 and the lower unit 200 to transmit their electric signals.

Figure 5:
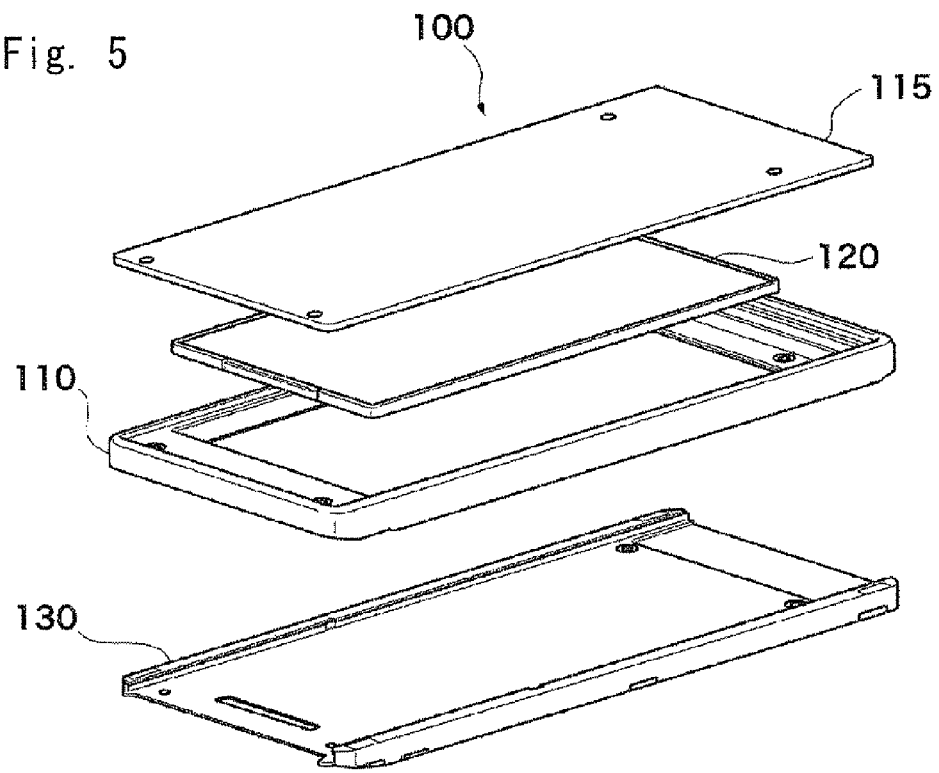
FIG. 5 is a perspective view showing a portable device with a disassembled upper unit according to an exemplary embodiment.
Figure 6:
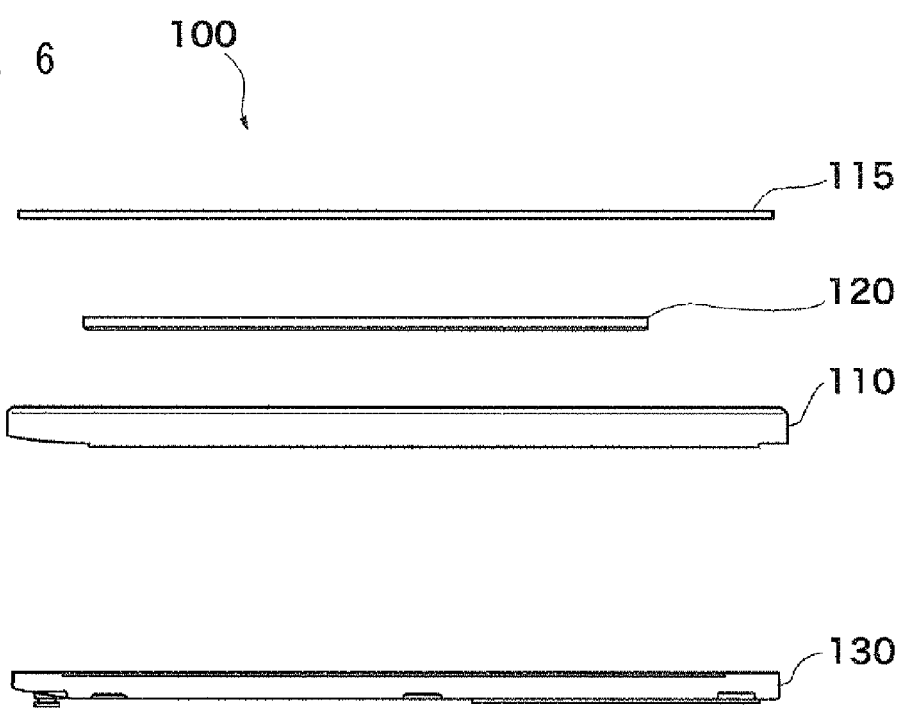
FIG. 6 is a side view showing a portable device with a disassembled upper unit according to an exemplary embodiment.

FIG. 5 is a perspective view showing the portable device with a disassembled upper unit according to this exemplary embodiment, and FIG. 6 shows its side view. As shown in FIGS. 5 and 6, a display unit 120 is attached to the upper case 110 and the upper cover 115 is attached so as to cover this display unit 120 and the upper part of the upper case 110. By attaching the upper cover 115 so as to cover the display unit 120 in this manner, it is possible to protect the display unit 120 from external impacts. Further, the guide member unit 130 is attached to the lower part of the upper case 110.

Figure 7:
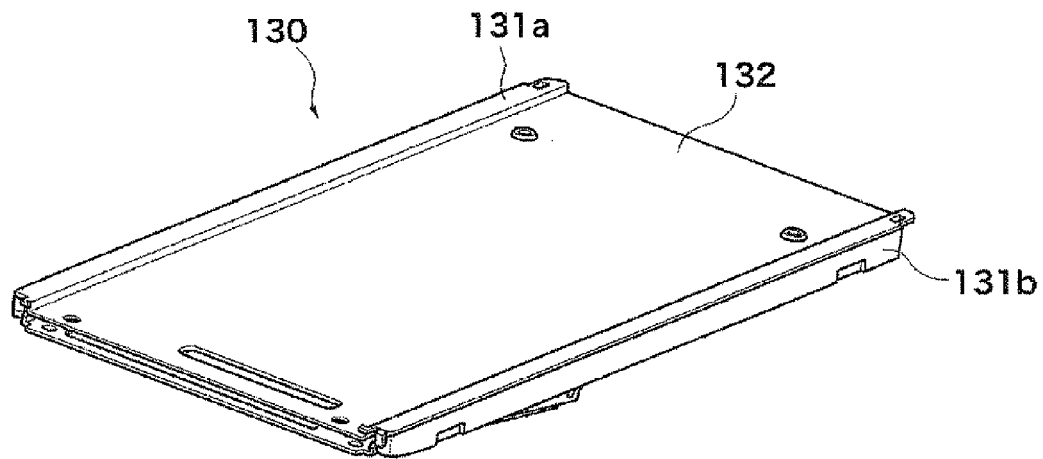
FIG. 7 is a perspective view of a guide member unit of a portable device according to an exemplary embodiment.
Figure 8:
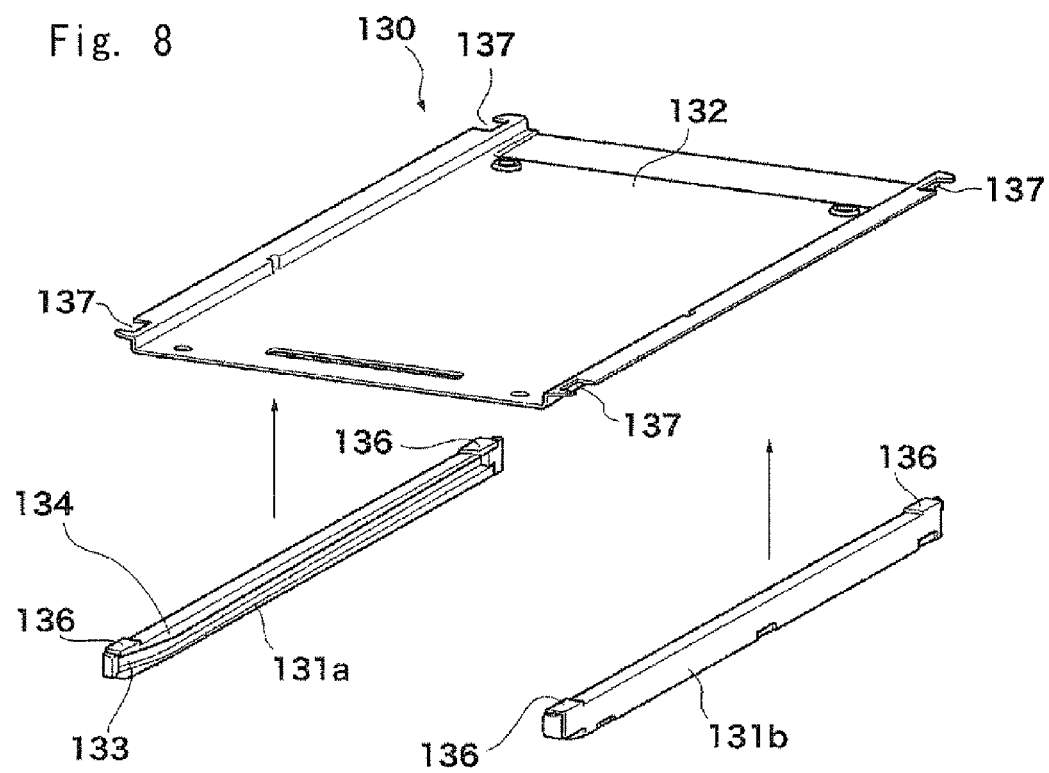
FIG. 8 is a perspective view showing a portable device with a disassembled guide member unit according to an exemplary embodiment.

FIG. 7 is a perspective view of the guide member unit of the portable device according to this exemplary embodiment. Further, FIG. 8 is a perspective view showing the portable device with a disassembled guide member unit according to this exemplary embodiment. The guide member unit 130 includes guide members 131a and 131b, and a connecting plate 132. The connecting plate 132 has such a configuration that it can be attached to the upper case 110. Preferable material for both the connecting plate 132 and the guide members 131a and 131b is stainless steel. However, they can be formed of metal material other than stainless steel. For example, they can be formed of metal material containing at least one of steel, an aluminum alloy, a magnesium alloy, and a titanium alloy. The thickness of the connecting plate 132 directly influences the thickness of the assembled apparatus. Therefore, it is desirable to reduce the thickness of the connecting plate 132 in order to reduce the thickness of the portable device. Further, the guide members 131a and 131b can be fabricated by, for example, cutting, forging, or molding.

When the connecting plate 132 and the guide members 131a and 131b are both made of stainless steel, they can be fixed by welding. By fixing them using welding, it is possible to withstand a large load even when the bonding area is small. Needless to say, if it is possible to secure a sufficient bonding area, they can be fixed by using an adhesive, adhesion, calking, or the like. A groove 133 is formed in each of the guide members 131a and 131b. The grooves 133 are formed on the inner sides of the guide members 131a and 131b, i.e., on the sides of the guide members 131a and 131b that face each other in such a manner that the grooves 133 extend in the longitudinal direction. A gently-curved curved section 134 is formed near one end of each of the grooves 133.

Further, as shown in FIG. 8, the parts to which the guide members 131a and 131b are attached are formed by bending both ends of the connecting plate 132 upward and then further bending them outward. As a result, the guide members 131a and 131b can be fixed to the connecting plate 132 more firmly. Note that by engaging protrusions 136 formed at both ends on the upper surfaces of the guide members 131a and 131b with cutouts 137 formed at both ends of the respective bent parts of the connecting plate 132, the guide members 131a and 131b can be attached to the connecting plate 132. Further, by forming the bent parts at both ends of the connecting plate 132 in this manner, it is possible to increase the strength of the connecting plate 132.

Figure 9A:
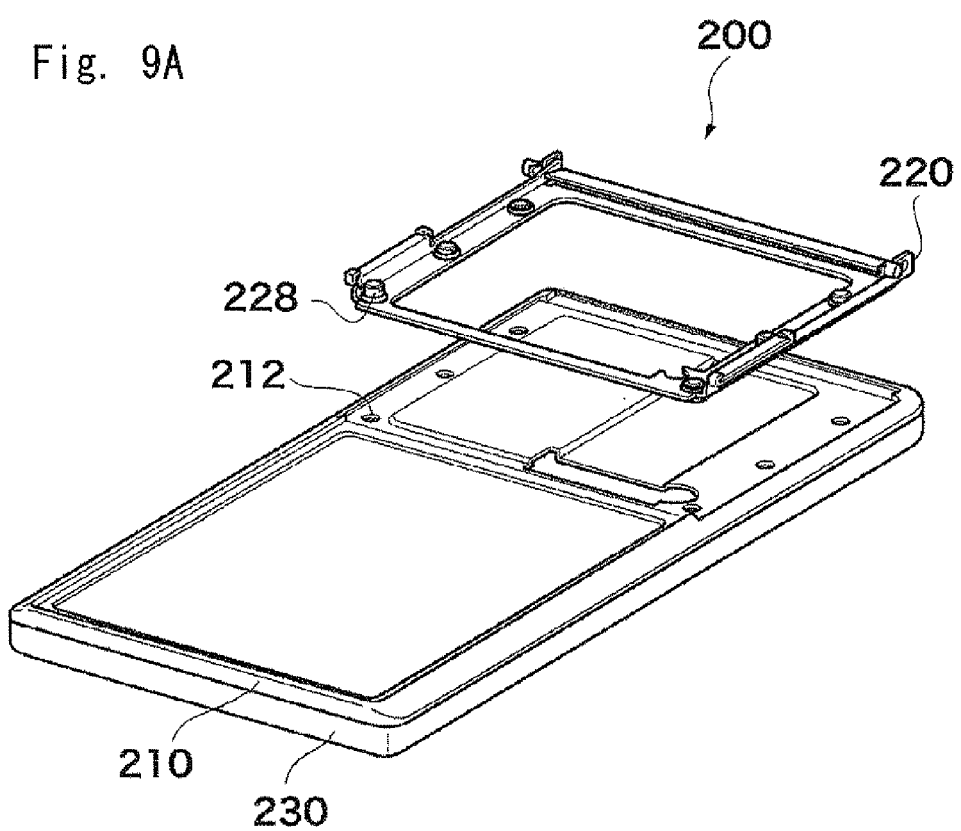
FIG. 9A is a perspective view of a lower unit of a portable device according to an exemplary embodiment, and shows a state where the guide member unit is detached from the lower unit.
Figure 9B:
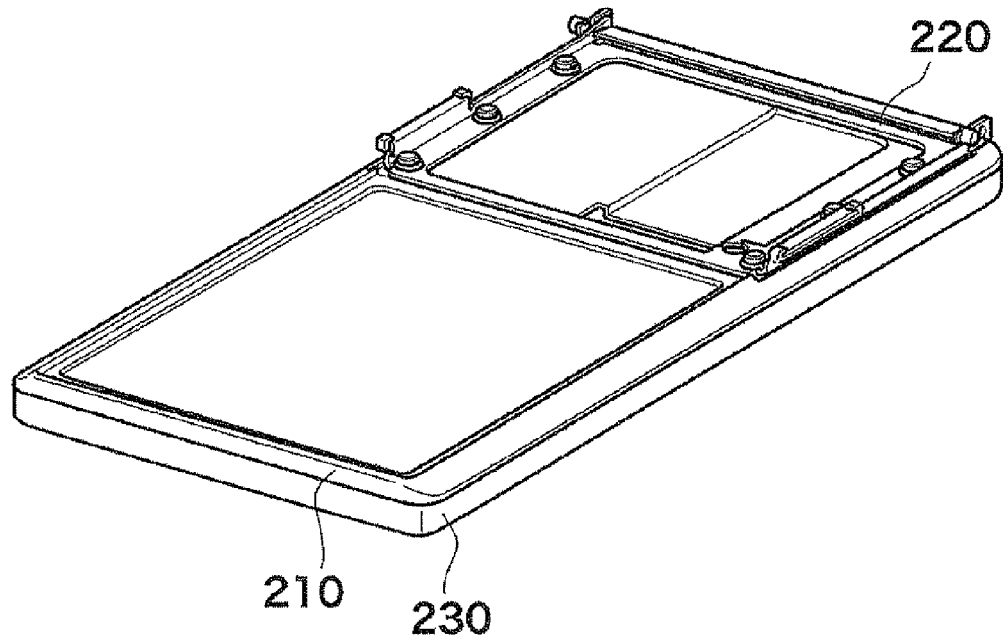
FIG. 9B is a perspective view of a lower unit of a portable device according to an exemplary embodiment, and shows a state where the guide member unit is attached to the lower unit.

FIGS. 9A and 9B are perspective views of the lower unit 200 of the portable device according to this exemplary embodiment. FIG. 9A shows a state in which the sliding member 220 is detached from the lower case 210, and FIG. 9B shows a state in which the sliding member 220 is attached to the lower case 210. The lower case 210 can be formed, for example, as a hybrid unit of a stainless-steel metal plate and an exterior resin in order to receive the load of the key operation unit. By doing so, it is possible to reduce the thickness of the lower unit 200. Needless to say, if the reduction of the thickness is not important in terms of the design, the lower case 210 can be formed by using a plastic resin, a magnesium alloy, or an aluminum alloy.

Further, as shown in FIG. 9A, mounting holes 228 (six mounting holes in FIG. 9A) for fixing the sliding member 220 to the lower case 210 are formed in the sliding member 220. Further, mounting parts 212 for fixing the sliding member 220 are provided in the places corresponding to the mounting holes 228 in the lower case 210. Further, the sliding member 220 can be fixed to the lower case 210 by providing fixing members such as screws in the mounting holes 228 of the sliding member 220 and the mounting parts 212 of the lower case 210.

Figure 10:
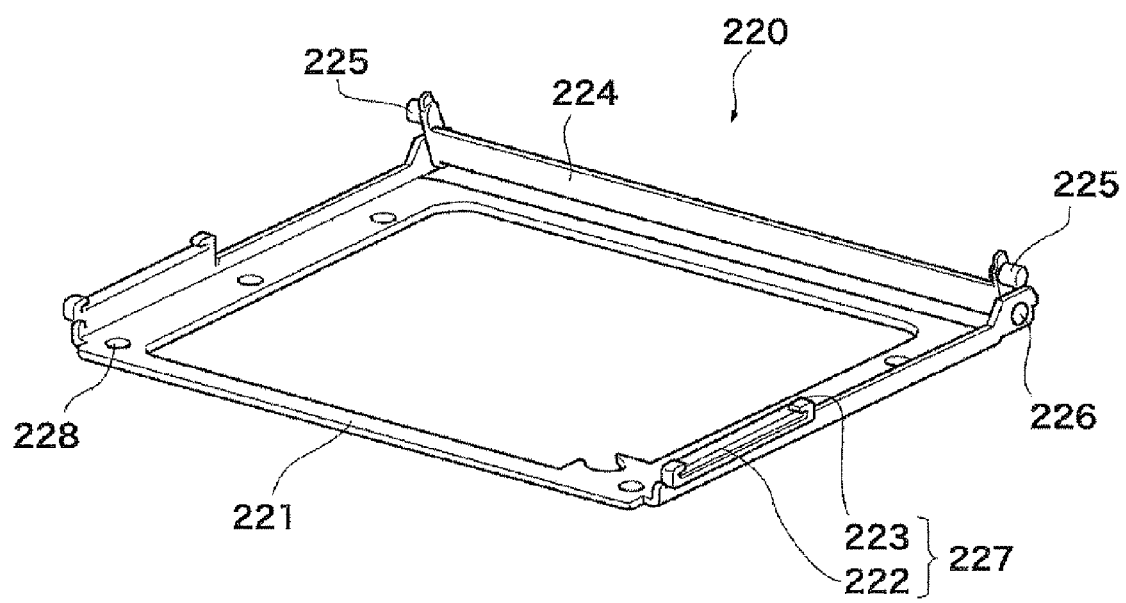
FIG. 10 is a perspective view of a sliding member of a portable device according to an exemplary embodiment.

FIG. 10 is a perspective view of the sliding member 220 of the portable device according to this exemplary embodiment. The sliding member 220 includes engaging sections 227 that slidably engage with the grooves 133 of the guide members 131a and 131b of the upper unit 100, a base 221 that comes into contact with the lower case 210 when the sliding member 220 is attached to the lower case 210, and mounting holes 228. Since the sliding member 220 needs to be robust, the sliding member 220 is preferably made of steel-based material typified by stainless steel. The engaging section 227 of the sliding member 220 can be formed, for example, by engaging a resin member 223 with a protrusion 222 of the sliding member 220 as shown in FIG. 10.

Note that it is possible to improve the strength of the engaging section 227 by integrally forming the protrusion 222 with the sliding member 220 by using, for example, metal material such as stainless steel. In this way, it is possible to prevent the engaging sections 227 from being broken even if a stress is exerted in a different direction from the sliding direction when the engaging sections 227 engage with the guide member 131a or 131b. Further, the resin member 223 has a lubricating property. Therefore, by engaging the resin members 223 with the protrusions 222, the resistance that occurs when the engaging sections 227 slide in the grooves 133 of the guide members 131a and 131b can be reduced.

The resin member 223 needs to have a lubricating property and a withstanding property against a load caused by compression. Therefore, for example, an ordinary POM (polyacetal) resin can be used for the resin member 223. Alternatively, nylon resins, PBT (polybutylene terephthalate) resins, stronger PEEK (polyether ether ketone) resins, polyamide-based resins, PPS (poly(phenylene sulfide)) resins, ABS resins, and PC (polycarbonate) resins can be also used. By using these materials, it is possible to obtain an abrasion-resistance property, an excellent sliding property, and the like. In particular, PEEK resins are preferable material because of its load-withstanding property, abrasion-resistance property, and excellent sliding property.

Further, as shown in FIG. 10, the sliding member 220 may include a shield member 224. By providing the shield member 224, it is possible to shield the mechanical section such as connection cables connected between the upper unit 100 and the lower unit 200 and the torsion spring 240 from the outside even when the portable device is in the extended state and the upper unit 100 is thereby inclined at a predetermined angle with respect to the lower unit 200. One end of the shield member 224 is rotatably supported by a rotation pin 226, and a shield member sliding pin 225 that slidably engages with the groove 133 of the guide member 131a or 131b is disposed at the other end of the shield member 224. The rotation pin 226 and the shield member sliding pin 225 are provided on each of both sides in the longitudinal direction of the shield member 224 in such a manner that they protrude from the wall surface. Note that the pair of the shield member sliding pin 225 and the rotation pin 226 is formed in such a manner that they are arranged side by side in the longitudinal direction of the wall surface on each of both sides in the longitudinal direction of the shield member 224. The rotation pins 226 are disposed so as to engage with holes formed in the wall surfaces that are formed by bending both sides of the base 221. Further, the shield member sliding pins 225 are disposed so as to slidably engage with the grooves 133 of the guide members 131a and 131b.

Figure 11:
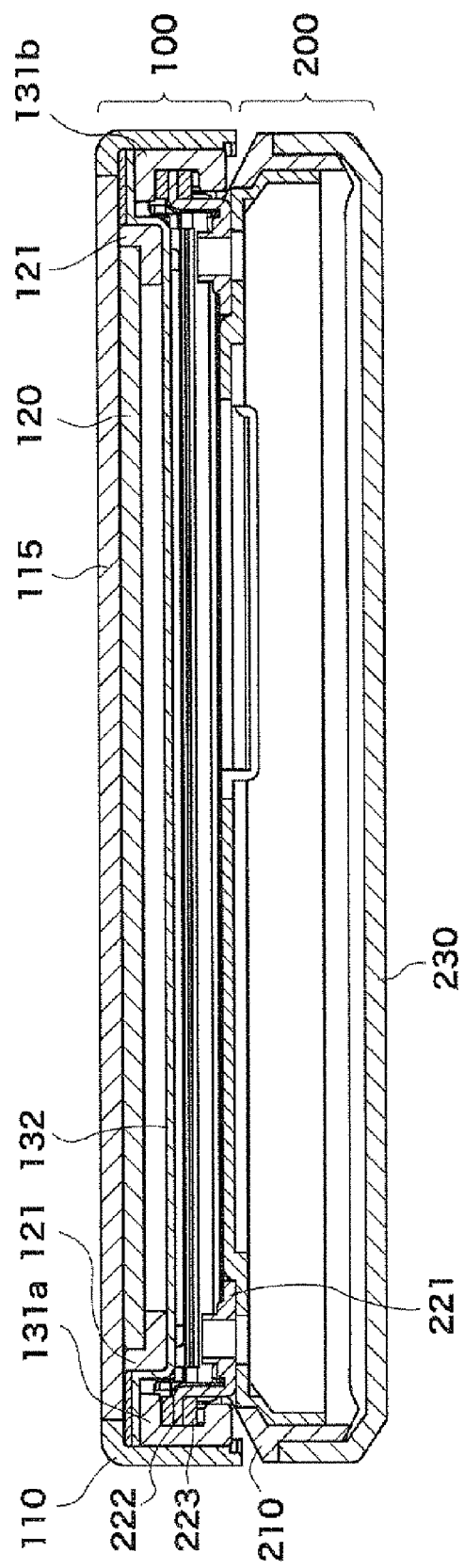
FIG. 11 is a cross-section of a portable device according to an exemplary embodiment, taken along the line XI-XI in FIG. 1.
Figure 12:
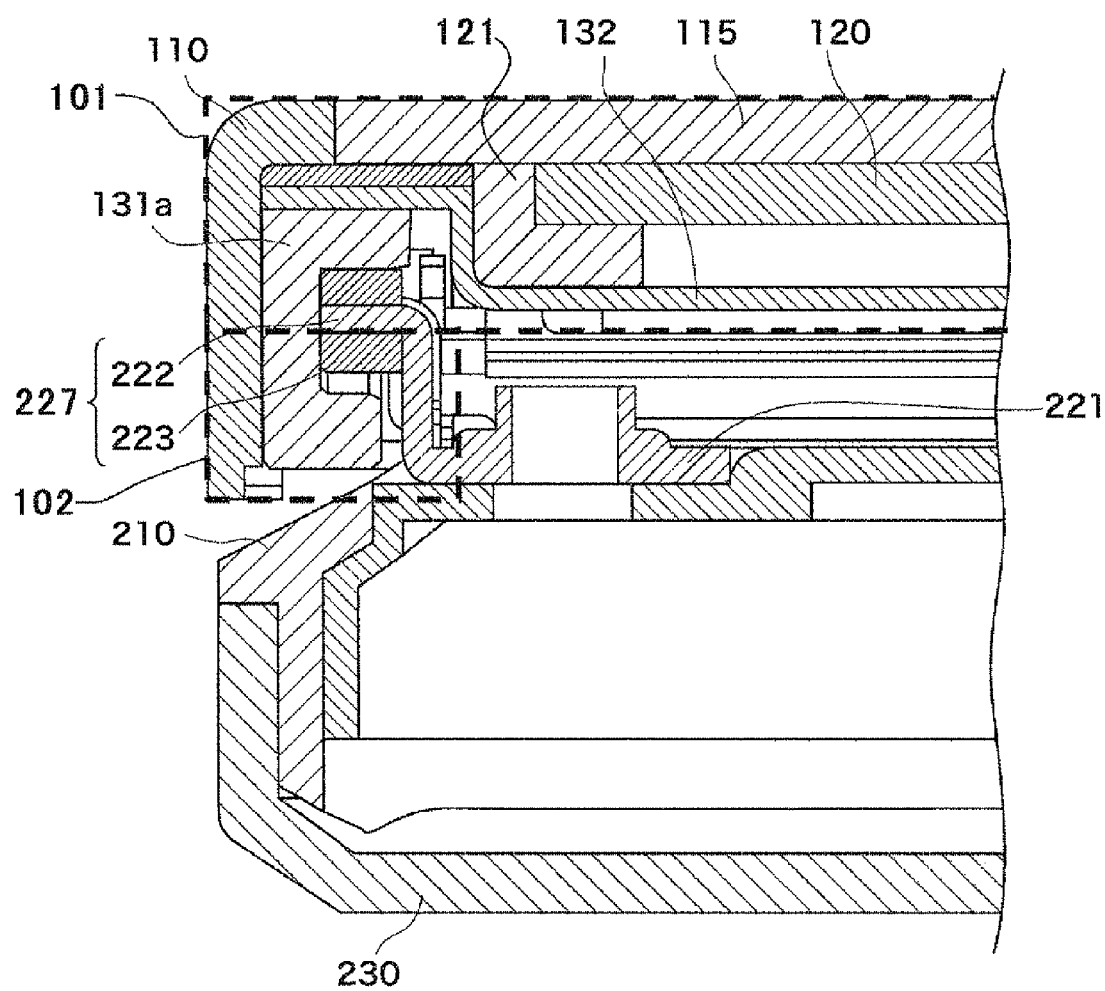
FIG. 12 is an enlarged view of a section near a guide member 131a in the cross-section shown in FIG. 11.
Figure 13:
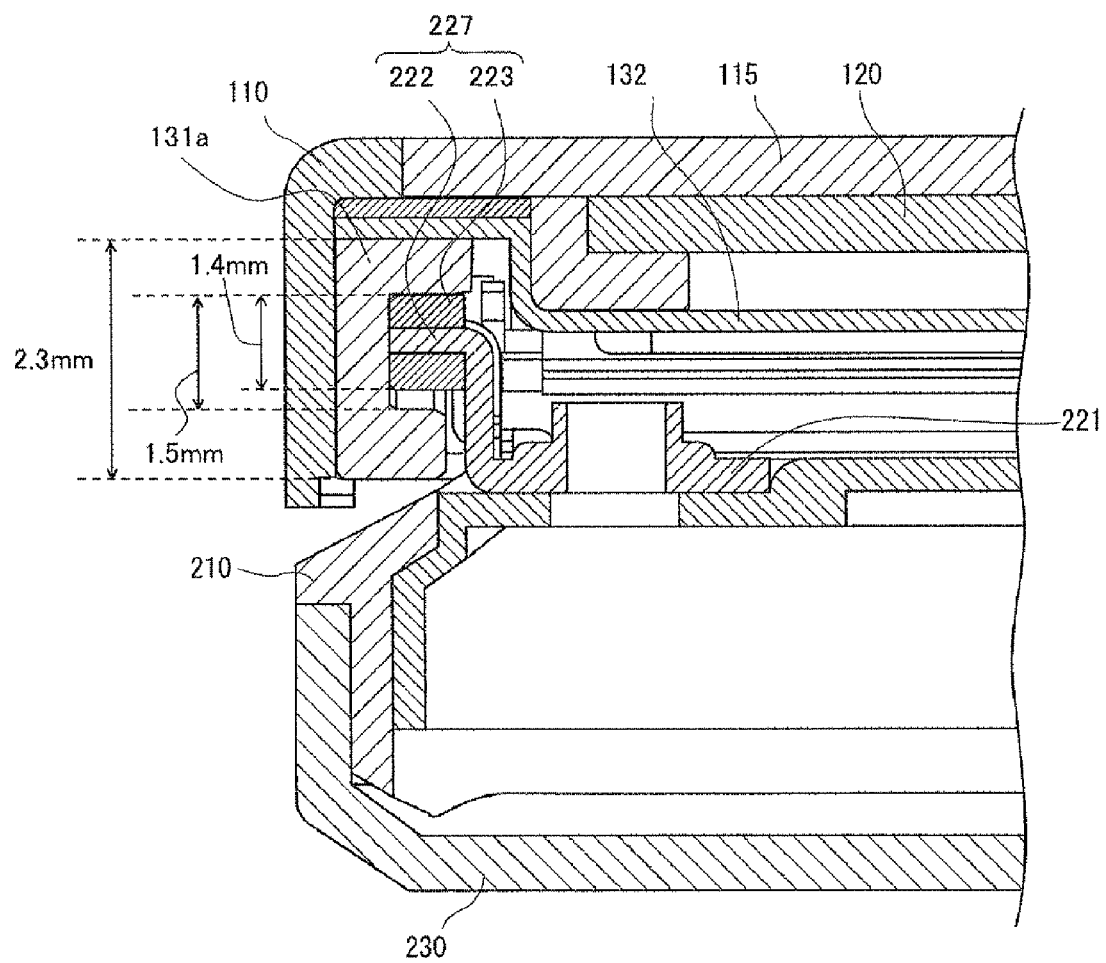
FIG. 13 is an enlarged view of a section near a guide member 131a in the cross-section shown in FIG. 11.

FIG. 11 is a cross-section of the portable device according to this exemplary embodiment, taken along the line XI-XI in FIG. 1. Further, FIG. 12 is an enlarged view of a section near the guide member 131a in the cross-section shown in FIG. 11. As shown in FIGS. 11 and 12, the upper case 110 is disposed on the sides of the upper unit 100 and the upper cover 115 is disposed on the top of the upper unit 100. The display unit 120 is disposed below the upper cover 115 in such a manner that display unit 120 is in contact with the upper cover 115. Further, the connecting plate 132 is disposed below the display unit 120 with a spacer(s) 121 interposed therebetween. The guide members 131a and 131b are respectively disposed on both sides of the connecting plate 132. Note that by bending both ends of the connecting plate 132 upwardly and then bending them outwardly, the mounting positions of the guide members 131a and 131b can be shifted to the upper cover 115 side.

Further, as shown in FIGS. 11 and 12, the lower cover 230 is attached to the lower case 210 of the lower unit 200. The base 221 of the sliding member 220 is attached above the lower case 210. Further, the engaging sections 227 each composed of the protrusion 222 and the resin member 223 are disposed so as to engage with the grooves 133 of the guide members 131a and 131b. That is, the resin member 223 is disposed in such a manner that the support section 223a (and support section 223b) of the resin member 223 is in contact with the upper wall surface 133a of the groove 133 of the guide member 131a or 131b and the flat section 223c of the resin member 223 is in contact with the lower wall surface 133b of the groove 133 of the guide member 131a or 131b. In this case, a small space may be formed at least one of between the support section 223a (and support section 223b) of the resin member 223 and the upper wall surface 133a of the groove 133 and between the flat section 223c of the resin member 223 and the lower wall surface 133b of the groove 133. By forming a space in this manner, the resin member 223 can slide in the groove 133 more smoothly.

As shown in FIG. 12, the upper unit 100 of the portable device according to this exemplary embodiment includes a convex section 102 (indicated by a broken line) at each of both ends of the upper unit 100, and at least part of the guide member 131a or 131b is formed in this convex section 102. That is, in FIG. 12, the area containing the upper cover 115, the display unit 120, the spacer 121, and the connecting plate 132 is an upper unit main body 101 (indicated by a broken line), and the convex section 102 (indicated by a broken line) is disposed on the lower unit 200 side of this upper unit main body 101. Further, the guide member 131a is disposed in part of the convex section 102. In the example shown in FIGS. 11 and 12, the convex section 102 includes part of the side wall of the upper case 110 that is located below the lower surface of the protrusion 222, and part of the side wall and the inwardly-protruding bottom section of the guide member 131a or 131b. The lower surface of the upper unit main body 101 includes the same surface as the lower surface of the protrusion 222, and the upper surface of the lower unit 200 is disposed immediately below the lower surface of the upper unit main body 101. Note that a predetermined gap may be formed between the lower surface of the upper unit main body 101 and the upper surface of the lower unit 200.

The sizes of the main components are mentioned hereinafter. Note that the below-mentioned numerical values are merely examples, and the present invention is not limited to those numerical values. For example, the thickness of the engaging section 227 including the protrusion 222 and the resin members 223 disposed on the top and the bottom respectively of the protrusion 222 is 1.4 mm. In this case, in order to enable the engaging section 227 having a thickness of 1.4 mm to slide in the groove of the guide member 131a, the width of the groove is, for example, 1.5 mm. Further, the overall height of the guide member 131a is, for example, 2.3 mm.

Figure 14:
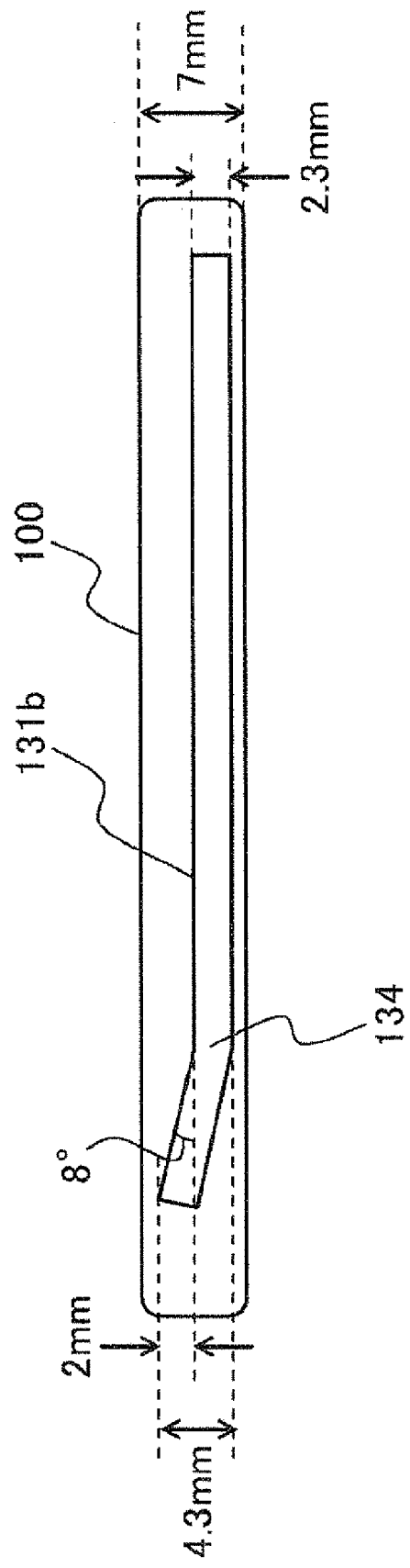
FIG. 14 is a figure for explaining the overall height of a guide member including a curved section.

Further, the curved section 134 is provided in each of the guide members 131a and 131b so that the upper unit 100 is inclined with respect to the lower unit 200 when the portable device is in the extended state in this exemplary embodiment. FIG. 14 is a figure for explaining the overall height of the guide member including the curved section 134. Note that FIG. 14 is a side view of the upper unit of the portable device. As shown in FIG. 14, assuming that the curved section of the guide member 131b is inclined at 8°, for example, the height of the highest point of the guide member 131b is higher than the height of the other part of the guide member 131b, which is 2.3 mm, by 2 mm. Therefore, the overall height of the guide member 131b becomes 4.3 mm, and the upper unit 100 needs to have enough space to accommodate the guide members 131a and 131b having a height of 4.3 mm.

Figure 15A:
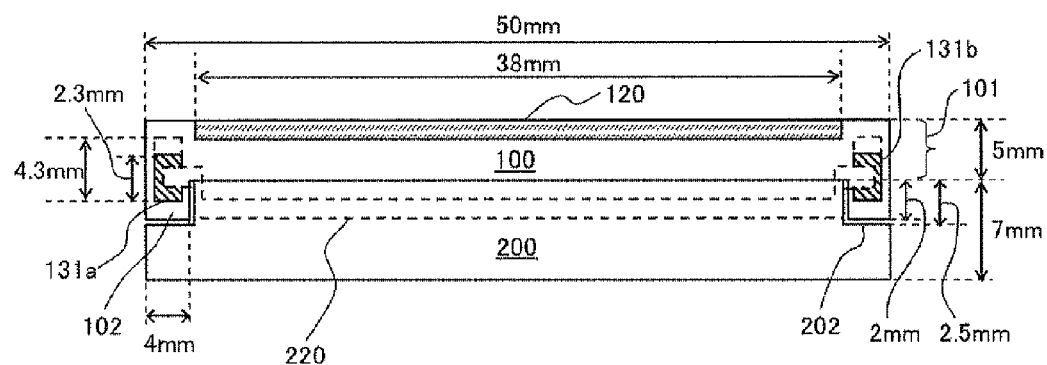
FIG. 15A is a cross-section showing an example of a portable device according to an exemplary embodiment and shows a case where the thickness of an upper unit main body is reduced.
Figure 15B:
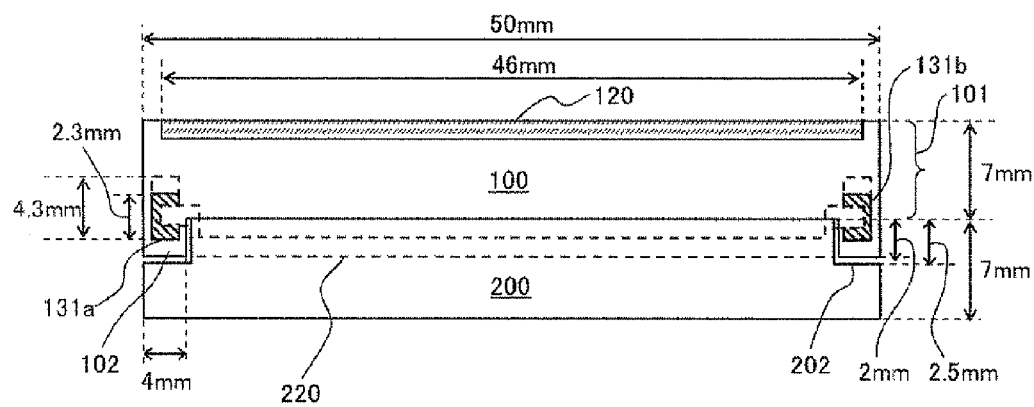
FIG. 15B is a cross-section showing an example of a portable device according to an exemplary embodiment and shows a case where the width of a display unit is increased.

FIGS. 15A and 15B are cross-sections showing an example of the portable device according to this exemplary embodiment. In the portable device shown in FIG. 15A, convex sections (protruding sections) 102 are formed at both ends of the upper unit 100, and guide members 131a and 131b whose overall height is 4.3 mm are formed in at least part of the respective convex sections 102. In FIG. 15A, the height of the convex sections 102 is 2 mm and the width is 4 mm. Further, the broken lines above the guide members 131a and 131b indicate the parts of the guide members 131a and 131b that are formed by bending the guide members at curved sections 134 (see FIG. 14). In the example shown in FIG. 15A, a space of 7 mm (value obtained by adding the height of the convex section 102, i.e., 2 mm to the thickness of the upper unit main body 101, i.e., 5 mm) is secured in the vertical direction in order to accommodate the guide members 131a and 131b having a height of 4.3 mm.

Figure 16:
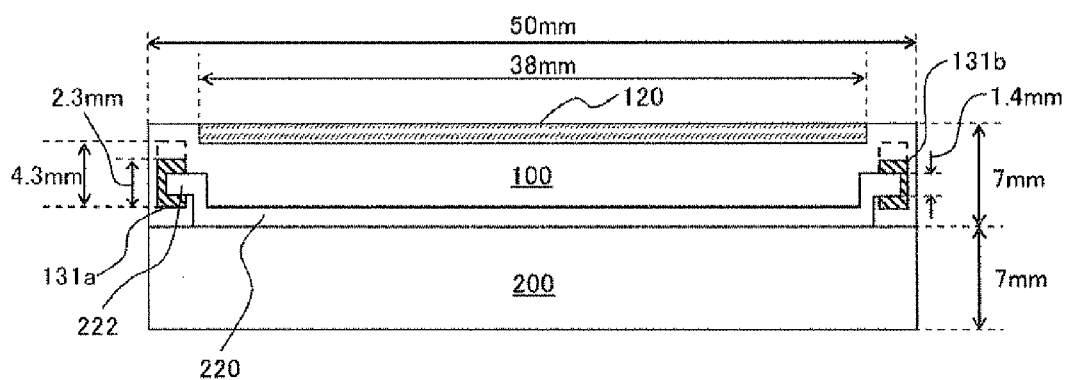
FIG. 16 shows a case (comparative example) where the convex section is not provided in an upper unit.

Meanwhile, FIG. 16 shows a case (comparative example) where the convex section 102 is not provided in the upper unit 100. In this case, a space of 7 mm is also secured in the vertical direction in order to accommodate the guide members 131a and 131b having a height of 4.3 mm as in the cases shown in FIGS. 15A and 15B, and the thickness of the upper unit 100 is thereby 7 mm. Further, in this case, the thickness of the lower unit 200 is also 7 mm. Therefore, the overall thickness of the portable device shown in FIG. 16 is 14 mm (thickness obtained by adding the thickness of the upper unit 100, i.e., 7 mm and the thickness of the lower unit 200, i.e., 7 mm).

In the portable device according to this exemplary embodiment, since the guide members 131a and 131b are formed in at least part of the convex sections 102 as shown in FIG. 15A, the positions of the guide members 131a and 131b can be shifted away from the upper surface of the upper unit 100. Therefore, it is possible to reduce the thickness of the upper unit main body 101, for example, to 5 mm in the portable device shown in FIG. 15A. Note that recessed sections (hollow sections) 202 are formed in the lower unit 200 in places corresponding to the convex sections 102 of the upper unit 100. In other words, in the portable device according to this exemplary embodiment, by disposing the guide members 131a and 131b in such a manner that they get into part of the lower unit 200, the positions of the guide members 131a and 131b can be shifted away from the upper surface of the upper unit 100. In this case, assuming that the thickness of the lower unit 200 is 7 mm, the overall thickness of the portable device can be reduced to 12 mm in the example shown in FIG. 15A. Therefore, in the portable device shown in FIG. 15A, by disposing part of the guide members 131a and 131b in the convex sections 102 of the upper unit 100 and forming these guide members 131a and 131b in such a manner that they get into part of the recessed sections 202 of the lower unit, it is possible to reduce the thickness of the portable device in comparison to that of the comparative example shown in FIG. 16 in which the convex sections 102 are not provided in the upper unit 100.

Further, for example, by constructing the portable device in such a manner that the convex sections of the upper unit 100 and the recessed sections of the lower unit 200 move away from each other when the portable device is brought into the retracted state, the upper unit 100 can be smoothly slid with respect to the lower unit 200. In the example shown in FIG. 15A, the depth of the recessed section 202 is, for example, 2.5 mm, which is larger than the height of the convex section 102, i.e., large than 2.0 mm.

Further, as shown in FIG. 15B, in the portable device according to this exemplary embodiment, by forming the guide members 131a and 131b in at least part of the convex sections 102 of the upper unit 100 and thereby disposing the guide members 131a and 131b in places away from the upper surface of the upper unit 100, it is possible to increase the space for disposing the display unit 120. As a result, it is possible to increase the width of the display unit 120. In the example shown in FIG. 15B, when the width of the upper unit 100 is 50 mm, the width of the display unit 120 can be increased to 46 mm. That is, it is possible to dispose the display unit 120 in such a manner that the display unit 120 is placed over at least part of the area in which the convex sections 102 are formed as viewed in the direction perpendicular to the main surface of the display unit 120 (i.e., as viewed from the top). Note that in the portable device shown in FIG. 16, which is the comparative example, it is impossible to secure any space for increasing the width of the display unit 120 above the guide members 131a and 131b. Therefore, it is impossible to increase the width of the display unit 120.

Note that FIG. 15A shows an example in which the thickness of the upper unit main body 101 is reduced, and FIG. 15B shows an example in which the width of the display unit 120 is increased. However, in the portable device according to this exemplary embodiment, the space that is generated by forming the guide members 131a and 131b in at least part of the convex sections 102 of the upper unit 100 may be used for purposes other than the above-mentioned purpose.

Further, in the portable device according to this exemplary embodiment, since the convex sections 102 are disposed in the upper unit 100, the upper unit 100 has a U-shaped cross section, i.e., has such a cross section that the side walls extend from both ends of the upper unit main body 101. Therefore, the geometrical moment of inertia of the upper unit 100 increases. As a result, it is possible to increase the strength of the upper unit. For example, as shown in FIGS. 15A and 15B, assuming that the width of the upper unit 100 is 50 mm and the thickness of the upper unit main body is 5 mm and that convex sections 102 each having a width of 4 mm and a height of 2 mm are disposed on both sides of the upper unit main body, the flexural rigidity is increased by a factor of 2.8 under the condition that the elastic modulus of the whole device is constant.

Figure 17A:
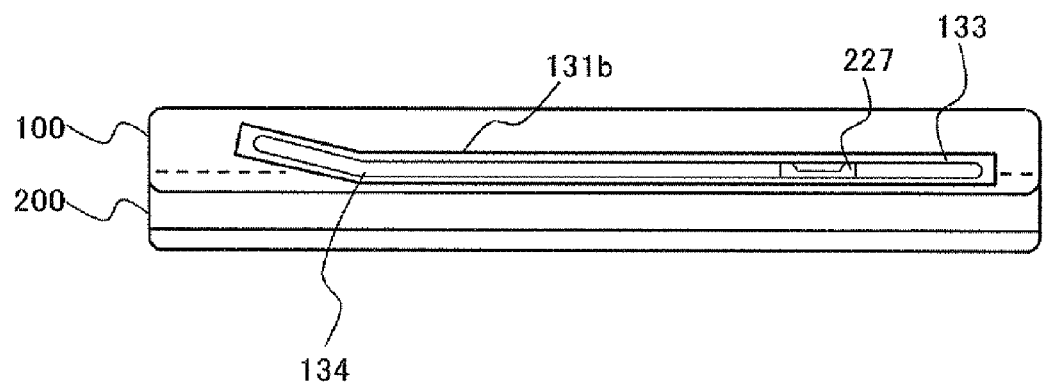
FIG. 17A is a figure for explaining an action of a portable device according to an exemplary embodiment and shows the portable device in a retracted state.
Figure 17B:
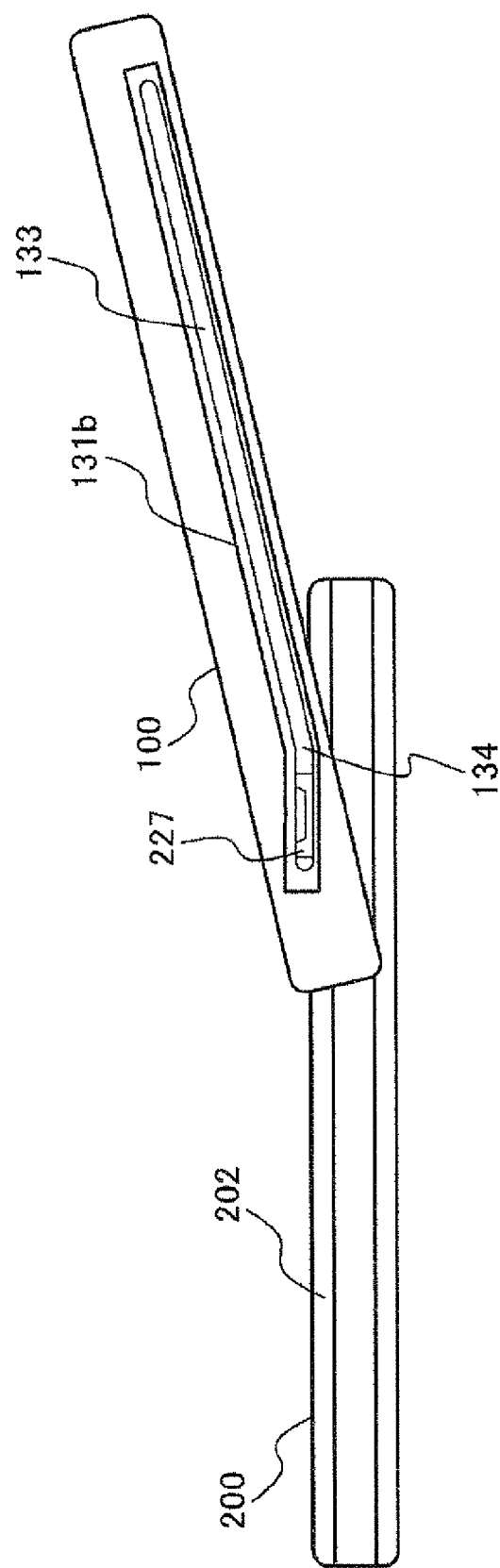
FIG. 17B is a figure for explaining an action of a portable device according to an exemplary embodiment and shows the portable device in an extended state.

Next, an action of the portable device according to this exemplary embodiment is explained. FIGS. 17A and 17B are figures for explaining an action of the portable device according to this exemplary embodiment. FIG. 17A shows the portable device in the retracted state, and FIG. 17B shows the portable device in the extended state. FIGS. 17A and 17B show a positional relation between the upper unit 100 and the lower unit 200 of the portable device and a positional relation of the engaging section 227 of the sliding member in the groove 133 of the guide member as viewed from the side. Note that as shown in FIG. 17B, in the portable device according to this exemplary embodiment, the curved section 134 is provided in the middle of the groove 133 of the guide member so that the upper unit 100 is inclined with respect to the lower unit 200 in the extended state.

In the retracted state shown in FIG. 17A, the upper unit 100 and the lower unit 200 are positioned on top of each other as viewed from the top. In this state, the engaging section 227 is located on the right side of the groove 133 in the drawing. Then, when the upper unit 100 is moved to the right in the drawing, the engaging section 227 moves in the groove 133 and passes through the curved section 134. As a result, the upper unit 100 is inclined as shown in FIG. 17B. In this state, the engaging section 227 is located on the left side of the groove 133 in the drawing.

Figure 18A:
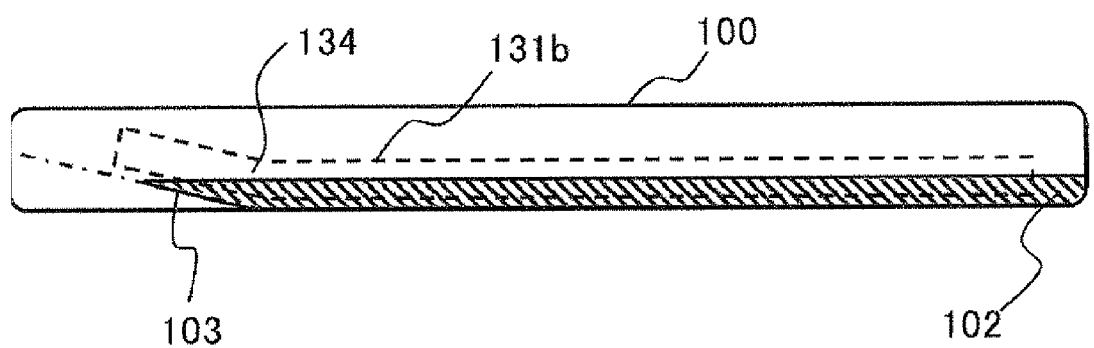
FIG. 18A is a side view of an upper unit of a portable device according to an exemplary embodiment.
Figure 18B:
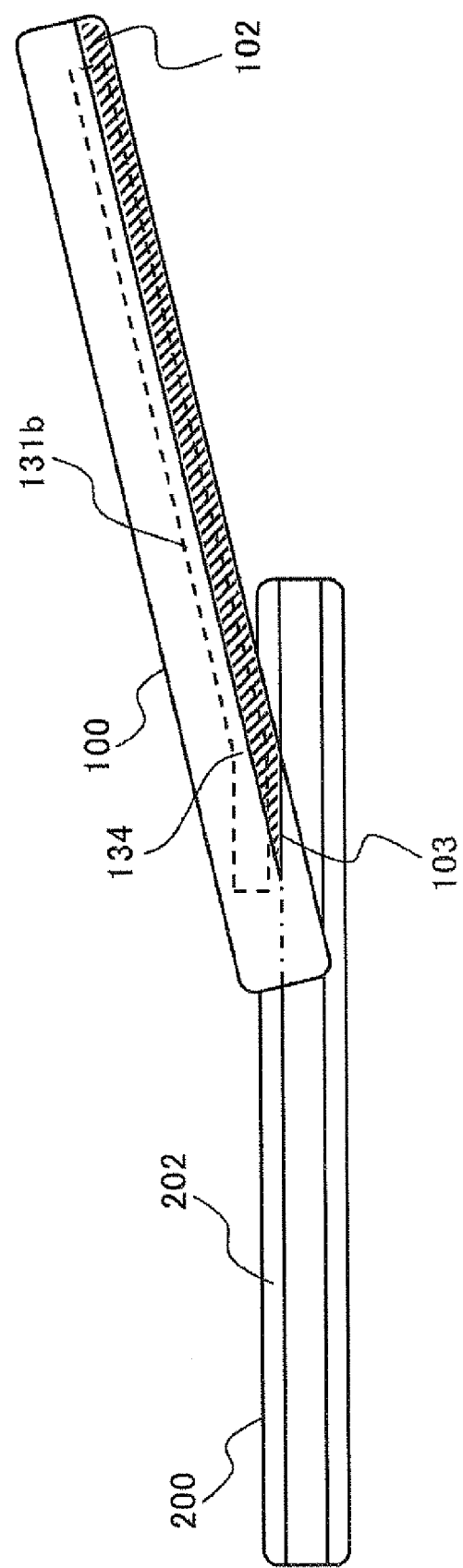
FIG. 18B is a side view of a portable device according to an exemplary embodiment in an extended state.

FIG. 18A is a side view of the upper unit 100 of the portable device according to this exemplary embodiment. As shown in FIG. 18A, the convex section 102 (indicated by hatch lines) of the upper unit 100 of the portable device according to this exemplary embodiment includes an inclined section 103. FIG. 18B is a side view of the portable device according to this exemplary embodiment in the extended state. As shown in FIG. 18B, by providing the inclined section 103 that is bent at the curved section 134 of the guide member 131b located in the convex section 102 of the upper unit 100, it is possible to prevent the convex section 102 from interfering with the lower unit 200 in the extended state. Further, the upper unit 100 is constructed so that the components of the upper unit 100 do not interfere with the lower unit 200 in this state.

As explained so far, in the portable device according to this exemplary embodiment, the convex sections 102 are formed on the lower unit 200 side of the upper unit 100 and the guide members 131a and 131b are formed in at least part of these convex sections 102. As a result, a space can be formed in the upper section of the upper unit 100. Therefore, it is possible to reduce the thickness of the upper unit main body 101 and thereby reduce the overall thickness of the portable device. Further, it is also possible to increase the width of the display unit 120.

Figure 19:
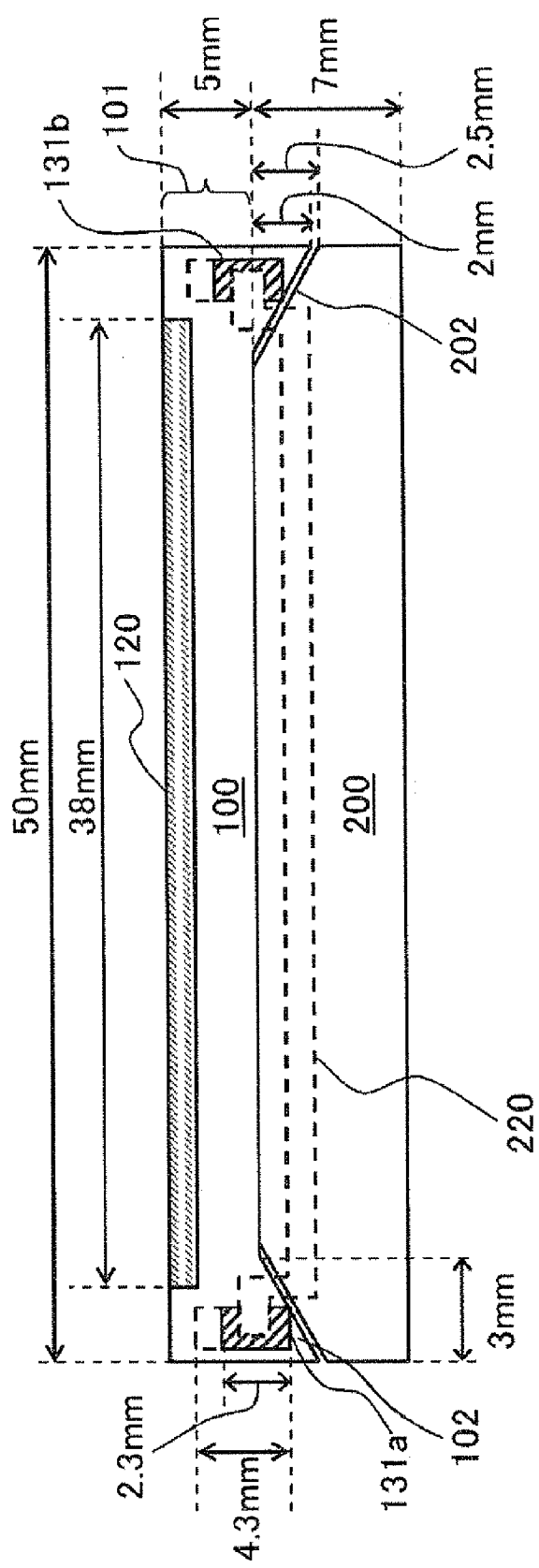
FIG. 19 is a cross section showing another aspect of a portable device according to an exemplary embodiment.

Note that the present invention is not limited to the above-described exemplary embodiments, and various modifications can be made without departing from the spirit of the present invention. For example, the convex section 102 of the upper unit 100 may be formed as a protruding section 102 having an inclined surface as shown in FIG. 19 instead of being formed in the shape shown in FIGS. 15A and 15B. In this case, the hollow section 202 of the lower unit 200 may be also formed as a hollow section 202 having an inclined surface so as to conform to the protruding section 102 of the upper unit 100.

That is, as shown in FIG. 19, the protruding section 102 can be formed in such a shape that the protruding section protrudes to a larger extent toward the lower unit 200 side as it gets closer to the edge of the upper unit 100 from the inner part of the upper unit 100. Further, the hollow section 202 of the lower unit 200 can be formed in such a shape that the recess sinks deeper away from the upper unit 100 as it gets closer to the edge of the lower unit 200 from the inner part of the lower unit 200. By forming them in such shapes, it is possible to make the lower unit 200 has a shape that conforms to the shape of a human hand. Further, even in the portable device shown in FIG. 19, the protruding sections 102 are formed at both ends of the upper unit 100, and the guide members 131a and 131b whose overall height is 4.3 mm are formed in at least part of the respective convex sections 102. In FIG. 19, the height of the protruding sections 102 is 2 mm and the width is 3 mm. Further, a broken line above each of the guide members 131a and 131b indicates the part of the respective guide members 131a or 131b that is formed by bending the guide member at the curved section 134 (see FIG. 14). In the example shown in FIG. 19A, a space of 7 mm (value obtained by adding the height of the protruding section 102, i.e., 2 mm to the thickness of the upper unit main body 101, i.e., 5 mm) is secured in the vertical direction in order to accommodate the guide members 131a and 131b having a height of 4.3 mm.

In the portable device according to this exemplary embodiment, since the guide members 131a and 131b are formed in at least part of the protruding sections 102 as shown in FIG. 19, the positions of the guide members 131a and 131b can be shifted away from the upper surface of the upper unit 100. Therefore, it is possible to reduce the thickness of the upper unit main body 101, for example, to 5 mm in the portable device shown in FIG. 19. Note that hollow sections 202 are formed in the lower unit 200 in places corresponding to the protruding sections 102 of the upper unit 100. In other words, in the portable device according to this exemplary embodiment, by disposing the guide members 131a and 131b in such a manner that they get into part of the lower unit 200, the positions of the guide members 131a and 131b can be shifted away from the upper surface of the upper unit 100. In this case, assuming that the thickness of the lower unit 200 is 7 mm, the overall thickness of the portable device can be reduced to 12 mm in the example shown in FIG. 19. Therefore, in the portable device shown in FIG. 19, by disposing part of the guide members 131a and 131b in the protruding sections 102 of the upper unit 100 and forming these guide members 131a and 131b in such a manner that they get into part of the hollow sections 202 of the lower unit, it is possible to reduce the thickness of the portable device in comparison to the comparative example shown in FIG. 16 in which the convex sections 102 are not provided in the upper unit 100. Note that even in the portable device shown in FIG. 19, the width of the display unit 120 can be increased by adopting a similar configuration to that shown in FIG. 15B.

Figure 20:
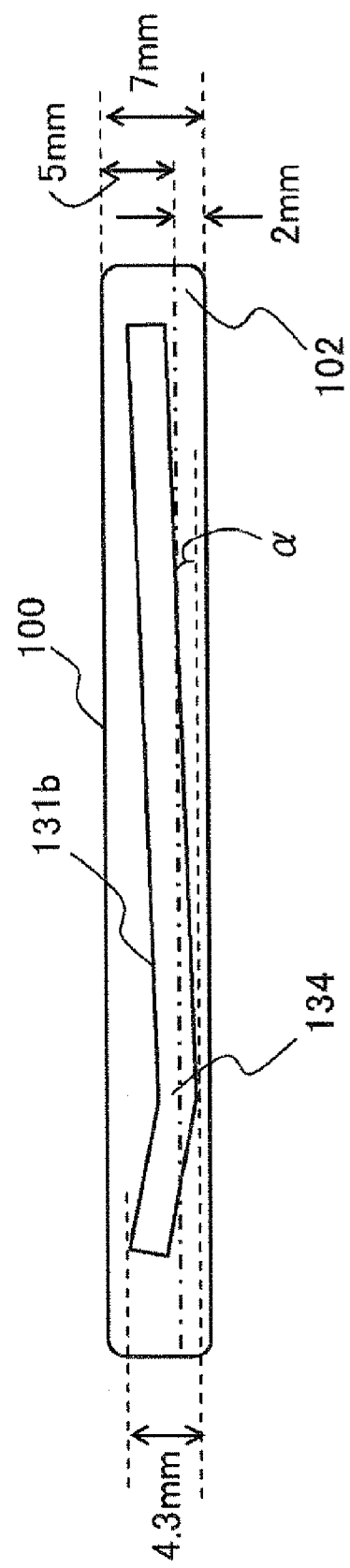
FIG. 20 is a cross section showing another aspect of a portable device according to an exemplary embodiment.

Further, in the portable device according to this exemplary embodiment, as shown in FIG. 20, for example, the guide members 131a and 131b of the upper unit 100 may be disposed so as to incline at an angle α with respect to the main surface (horizontal surface) of the upper unit 100. By inclining the guide members 131a and 131b at a predetermined angle in this manner, it is possible to prevent the upper unit 100 from coming into contact with the lower unit 200 when the upper unit 100 is slid, and thereby improve the operability. Note that a similar advantageous effect to the above-described advantageous effect can be also achieved without inclining the guide members 131a and 131b themselves, i.e., by disposing the sections of the guide members 131a and 131b between the right sides in the drawing and the curved sections 134 in parallel with the main surface (horizontal surface) of the upper unit 100 and inclining the grooves 133 of the guide members 131a and 131b in the range between the right sides in the drawing and the curved sections 134 at a predetermined angle.

Further, in this exemplary embodiment, a case where the curved sections 134 are disposed in the grooves 133 of the guide members 131a and 131b is explained. However, the present invention can be also applied to a portable device that includes guide members 131a and 131b including no curved section 134. That is, the present invention is applied to a portable device in which the upper unit 100 does not incline with respect to the lower unit 200 (the upper unit 100 slides roughly in parallel with the lower unit 200).

Figure 21:
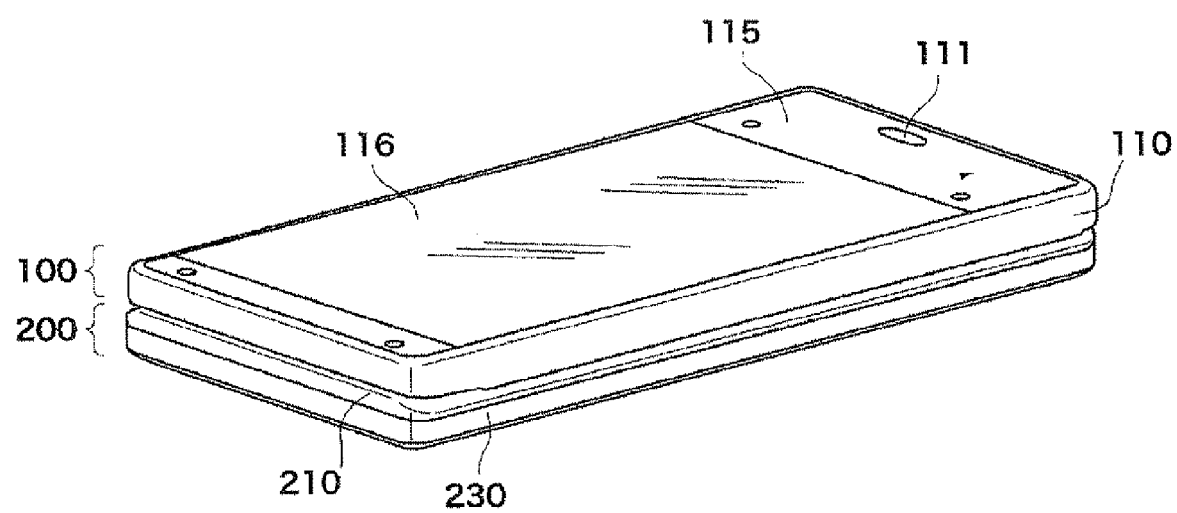
FIG. 21 is a cross section showing another aspect of a portable device according to an exemplary embodiment.

Further, the portable device according to this exemplary embodiment can be also applied to portable devices in which the display-unit cover 116 itself functions as a touch panel as shown in FIG. 21. In this case, as shown in FIG. 21, the key operation unit 113, which is provided in the portable device shown in FIG. 1, can be omitted.

So far, the present invention has been explained with the above-described exemplary embodiments. However, the present invention is not limited to the above-described exemplary embodiments, and needless to say, various modifications, corrections, and combinations that can be made by those skilled in the art are also included in the scope of the present invention specified in the claims of the present application.

This application is based upon and claims the benefit of priority from Japanese patent application No. 2010-116123, filed on May 20, 2010, the disclosure of which is incorporated herein in its entirety by reference.

INDUSTRIAL APPLICABILITY

The present invention can be applied to portable devices having a sliding mechanism.

REFERENCE SIGNS LIST

100 UPPER UNIT
101 UPPER UNIT MAIN BODY
102 CONVEX SECTION (PROTRUDING SECTION)
103 INCLINED SECTION
110 UPPER CASE
111 RECEIVER SOUND HOLE
113 KEY OPERATION UNIT
115 UPPER COVER
116 DISPLAY-UNIT COVER
120 DISPLAY UNIT
130 GUIDE MEMBER UNIT
131A, 131B GUIDE MEMBER
132 CONNECTING PLATE
133 GROOVE
134 CURVED SECTION
136 PROTRUSION
137 CUTOUT
200 LOWER UNIT
202 RECESSED SECTION (HOLLOW SECTION)
210 LOWER CASE
212 MOUNTING PART
220 SLIDING MEMBER
221 BASE
222 PROTRUSION
223 RESIN MEMBER
227 ENGAGING SECTION
228 MOUNTING HOLE
230 LOWER COVER
240 TORSION SPRING

The invention claimed is:
1. A portable device, comprises:
a first unit comprising a guide member extending in a sliding direction; and
a second unit comprising a sliding member that slides in a groove of the guide member, the second unit facing the first unit in a retracted state,
wherein the first unit comprises a convex section, the convex section projecting toward a second unit side and extending in the sliding direction,
wherein the second unit comprises a hollow section in a place corresponding to the convex section of the first unit,
wherein at least part of the guide member is formed in the convex section and formed in such a manner that the part of the guide member gets into the hollow section formed in the second unit,
wherein the convex section of the first unit has such a shape in a cross section taken in a direction perpendicular to the sliding direction that the convex section projects to a larger extent toward the second unit side as the convex section gets closer to an edge of the first unit from an inner part of the first unit,
wherein a hollow section of the second unit has such a shape that the hollow section sinks deeper away from the first unit as the hollow section gets closer to an edge of the second unit from an inner part of the second unit, and wherein, in a closed position of the portable device, an upper surface of the first unit extends parallel to a bottom surface of the second unit.

2. The portable device according to claim 1, wherein the first unit comprises a display unit, and the display unit is disposed in such a manner that the display unit is placed over at least part of an area in which the convex section is formed as viewed in a direction perpendicular to a main surface of the display unit.

3. The portable device according to claim 2, wherein the groove of the guide member comprises a curved section that makes the first unit incline at a predetermined angle with respect to the second unit in an extended state.

4. The portable device according to claim 2, wherein the convex section of the first unit comprises an inclined section that does not interfere with the second unit in an extended state.

5. The portable device according to claim 1, wherein the groove of the guide member comprises a curved section that makes the first unit incline at a predetermined angle with respect to the second unit in an extended state.

6. The portable device according to claim 5, wherein the groove of the guide member is inclined at a predetermined angle in a range between an end side of the first unit and the curved section.

7. The portable device according to claim 5, wherein the convex section of the first unit comprises an inclined section that does not interfere with the second unit in an extended state.

8. The portable device according to claim 1, wherein the convex section of the first unit comprises an inclined section that does not interfere with the second unit in an extended state.

9. The portable device according to claim 1, wherein the convex section of the first unit and the hollow section of the second unit move away from each other when the portable device is brought into the retracted state.

10. The portable device according to claim 1, wherein the guide member is inclined at a predetermined angle with respect to a main surface of the first unit.

11. The portable device according to claim 1, wherein the guide member comprises a metal material.

12. The portable device according to claim 11, wherein the guide member comprises a material containing at least one of steel, stainless steel, an aluminum alloy, a magnesium alloy, and a titanium alloy.

13. The portable device according to claim 1, wherein the guide member comprises guide members that are respectively placed in both ends of the first unit, comprise grooves in places that are opposed to each other, are fabricated by cutting, forging, or molding, and are bonded to a connecting plate by welding, gluing, or adhesion.

14. The portable device according to claim 1, wherein the guide member is disposed in a part of the convex section.

15. The portable device according to claim 1, wherein the convex section includes a part of a side wall of the guide member and a bottom section of the guide member.

16. The portable device according to claim 1, wherein the hollow section is located in the second unit in areas corresponding to the convex section of the first unit.

17. The portable device according to claim 1, wherein the guide member is disposed in a part of the convex section of the upper unit such that the guide member extends into a part of the hollow section of the second unit.

* * * * *